(12) United States Patent  
Tan

(10) Patent No.: US 7,754,609 B1  
(45) Date of Patent: Jul. 13, 2010

(54) CLEANING PROCESSES FOR SILICON CARBIDE MATERIALS

(75) Inventor: Samantha S. H. Tan, Union City, CA (US)

(73) Assignee: Applied Materials, Inc., Santa Clara, CA (US)

( * ) Notice: Subject to any disclaimer, the term of this patent is extended or adjusted under 35 U.S.C. 154(b) by 489 days.

(21) Appl. No.: 10/696,394

(22) Filed: Oct. 28, 2003

(51) Int. Cl.
B08B 7/04 (2006.01)

(52) U.S. Cl. .................. 438/689; 438/690; 438/745; 438/906; 438/905; 134/1; 134/1.3; 134/2; 134/3; 117/84; 117/951

(58) Field of Classification Search .............. 438/689, 438/690, 745, 906, 905; 117/84, 951; 134/1, 134/1.3, 2, 3
See application file for complete search history.

(56) References Cited

U.S. PATENT DOCUMENTS

| | | |
|---|---|---|
| 3,775,202 A | 11/1973 | Meek et al. |
| 3,969,195 A | 7/1976 | Dötzer et al. |
| 3,986,653 A | 10/1976 | Gilding |
| 3,992,454 A | 11/1976 | Kessler |
| 4,023,936 A | 5/1977 | Morse et al. |
| 4,078,963 A | 3/1978 | Symersky |
| 4,101,386 A | 7/1978 | Dötzer et al. |
| 4,139,348 A | 2/1979 | Swartz |
| 4,197,631 A | 4/1980 | Meyer et al. |
| 4,214,952 A | 7/1980 | Sato et al. |
| 4,232,060 A | 11/1980 | Mallory, Jr. |
| 4,272,612 A | 6/1981 | Oliver |
| 4,327,134 A | 4/1982 | Baldi |
| 4,367,119 A | 1/1983 | Logan et al. |
| 4,447,824 A | 5/1984 | Logan et al. |
| 4,448,800 A | 5/1984 | Ehara et al. |
| 4,459,155 A | 7/1984 | Cayless |
| 4,519,914 A | 5/1985 | Etani |
| 4,530,120 A | 7/1985 | Etani |
| 4,579,569 A | 4/1986 | Sheng et al. |
| 4,638,553 A | 1/1987 | Nilarp |
| 4,699,082 A | 10/1987 | Hakim |
| 4,863,561 A | 9/1989 | Freeman et al. |
| 4,957,583 A | 9/1990 | Buck et al. |

(Continued)

FOREIGN PATENT DOCUMENTS

JP    50087974    7/1975

(Continued)

OTHER PUBLICATIONS

Dewent. Englsih Abstract of TW 460611 A (2001).*

(Continued)

Primary Examiner—Robert M Kunemund
Assistant Examiner—Matthew J Song
(74) Attorney, Agent, or Firm—Dugan & Dugan, P.C.

(57) ABSTRACT

The cleaning of silicon carbide materials on a large-scale is described. Certain silicon carbide materials in the form of wafer-lift pins, wafer-rings and/or wafer-showerheads are cleaned by using a combination of two of more of the following steps, comprising: high temperature oxidation, scrubbing, ultrasonic assisted etching in an aqueous acid solution, ultrasonication in deionized water, immersion in an aqueous acid solution, and high temperature baking. The silicon carbide materials may either be sintered or formed by chemical vapor deposition.

41 Claims, 8 Drawing Sheets

U.S. PATENT DOCUMENTS

| | | | |
|---|---|---|---|
| 4,971,590 A | 11/1990 | Tong | |
| 4,980,017 A | 12/1990 | Kaji et al. | |
| 5,104,501 A | 4/1992 | Okabayashi | |
| 5,152,878 A | 10/1992 | Datta et al. | |
| 5,221,421 A | 6/1993 | Leibovitz et al. | |
| 5,365,112 A | 11/1994 | Ohshima | |
| 5,516,399 A | 5/1996 | Balconi-Lamica et al. | |
| 5,593,339 A | 1/1997 | Yam et al. | |
| 5,614,027 A | 3/1997 | Dunn et al. | |
| 5,660,640 A * | 8/1997 | Laube | 134/1 |
| 5,665,473 A | 9/1997 | Okoshi et al. | |
| 5,712,198 A | 1/1998 | Shive et al. | |
| 5,744,214 A | 4/1998 | Berasi et al. | |
| 5,749,467 A * | 5/1998 | Gregerson | 206/445 |
| 5,766,979 A | 6/1998 | Budnaitis | |
| 5,840,402 A | 11/1998 | Roberts et al. | |
| 5,863,801 A * | 1/1999 | Southgate et al. | 436/63 |
| 5,882,598 A * | 3/1999 | Lindquist et al. | 422/82.02 |
| 5,888,308 A | 3/1999 | Sachdev et al. | |
| 5,891,354 A | 4/1999 | Lee et al. | |
| 5,908,819 A | 6/1999 | Reynolds et al. | |
| 5,929,521 A | 7/1999 | Wark et al. | |
| 5,966,593 A | 10/1999 | Budnaitis et al. | |
| 6,012,966 A | 1/2000 | Ban et al. | |
| 6,083,320 A * | 7/2000 | Lee | 118/58 |
| 6,147,003 A * | 11/2000 | Tabara et al. | 438/704 |
| 6,187,216 B1 | 2/2001 | Dryer et al. | |
| 6,199,563 B1 * | 3/2001 | Uehara et al. | 134/25.4 |
| 6,273,950 B1 * | 8/2001 | Kitabatake | 117/95 |
| 6,352,081 B1 * | 3/2002 | Lu et al. | 134/22.1 |
| 6,368,410 B1 | 4/2002 | Gorczyca et al. | |
| 6,375,752 B1 * | 4/2002 | Otsuki et al. | 134/1 |
| 6,394,023 B1 | 5/2002 | Crocker | |
| 6,419,757 B2 * | 7/2002 | Otsuki et al. | 134/26 |
| 6,475,444 B1 | 11/2002 | Zimmermann et al. | |
| 6,488,037 B1 * | 12/2002 | Guldi | 134/1.3 |
| 6,506,254 B1 | 1/2003 | Bosch et al. | |
| 6,569,252 B1 | 5/2003 | Sachdev et al. | |
| 6,579,153 B2 | 6/2003 | Uchikura et al. | |
| 6,607,605 B2 | 8/2003 | Tan | |
| 6,767,840 B1 | 7/2004 | Uehara et al. | |
| 6,810,887 B2 | 11/2004 | Tan | |
| 7,045,072 B2 | 5/2006 | Tan et al. | |
| 7,091,132 B2 | 8/2006 | Tan et al. | |
| 2003/0000458 A1 | 1/2003 | Marumo et al. | |
| 2003/0096562 A1 | 5/2003 | Kurogouchi | |
| 2003/0136428 A1 | 7/2003 | Krogh | |
| 2003/0183244 A1 | 10/2003 | Rossman | |
| 2004/0060579 A1 | 4/2004 | Kim et al. | |
| 2005/0016565 A1 | 1/2005 | Tan et al. | |
| 2005/0050708 A1 | 3/2005 | Huang et al. | |
| 2005/0173569 A1 | 8/2005 | Noorbakhsh | |
| 2008/0099054 A1 | 5/2008 | Rabinovich et al. | |
| 2009/0197004 A1 | 8/2009 | Tan et al. | |

FOREIGN PATENT DOCUMENTS

| | | |
|---|---|---|
| JP | 11-290805 | 10/1999 |
| TW | 460611 | 10/2001 |
| WO | WO 02/15255 A1 * | 2/2002 |

OTHER PUBLICATIONS

Hoffman, H.S., Molybdenum Cleaning Solution, *IBM Technical Disclosure Bulletin*, 3(5):36, (1960).

*Metrology for Manufacturing:* Surface Measurement. [online] Michigan Technological University, undated [retrieved on Aug. 9, 2005]. Retrieved from the Internet: <URL: http://www.mfg.mtu.edu/cyberman/quality/metrology/surface.html>.

Spring, S., *Metal Cleaning*, Reinhold Publishing Corporation, New York, pp. 85-89, (1963).

* cited by examiner

CLEANING PROCESSES FOR SILICON CARBIDE MATERIALS

CROSS REFERENCE TO RELATED APPLICATIONS

This invention is related to U.S. patent application Ser. No. 10/627,416 entitled "ULTRASONIC ASSISTED ETCH USING CORROSIVE LIQUIDS" filed by Samantha S. H. Tan on Jul. 24, 2003, the content of which is incorporated herein by reference. This invention is also related to U.S. patent application Ser. No. 10/627,185 entitled "CLEANING PROCESS AND APPARATUS FOR SILICATE MATERIALS" filed by Samantha S. H. Tan and Ning Chen on Jul. 24, 2003, the content of which is incorporated herein by reference.

FIELD OF THE INVENTION

This invention relates to cleaning processes and, more specifically, to cleaning processes for silicon carbide materials.

BACKGROUND OF THE INVENTION

Several forms of silicon carbide materials are used in the manufacture of semi-conductor wafers. For example, hollow silicon carbide pins are used as wafer-lift pins. Silicon carbide rings are used as wafer-rings for holding e-chucks. Silicon carbide wafer-showerheads are used in cleaning semi-conductor wafers. However, such materials are required to be ultra-clean in order not to contaminate the semi-conductor wafers. The silicon carbide wafer-lift pins, wafer-rings and wafer-showerheads can be made either by a sintering process or by chemical vapor deposition (CVD). While sintered silicon carbide materials are less expensive, they possess more impurities, and thus require more cleaning than CVD silicon carbide materials.

FIG. 1A is a simplified longitudinal cross-sectional view of a hollow silicon carbide wafer-lift pin 100 with plenum 104. Both the exterior surface of the silicon carbide wafer-lift pin as well as the interior surface of the silicon carbide wafer-lift pin needs to be cleaned before such pins are used in the manufacture of semi-conductor wafers. Thus, exterior surface 105 and interior surface 106 of silicon carbide wafer-lift pin 100 need to be cleaned to a high degree of purity.

FIG. 1B is a simplified drawing illustrating a plan view 110 of a silicon carbide wafer-ring 112. Arrows A-A indicate the direction of the cross-sectional view of wafer-ring 112 as illustrated in FIG. 1C. In FIG. 1B, the recessed portion 114 represents a lowered lip 114 at the inner diameter of the wafer-ring. Lip 114 aids in holding an e-chuck as described with reference to FIG. 1C.

FIG. 1C a simplified drawing illustrating a cross-sectional view 120 of the wafer-ring of FIG. 1B taken in the direction A-A as shown in FIG. 1B. In FIG. 1C, wafer-ring 124, fits over e-chuck 122. Lip 126 of wafer-ring 124 helps hold the e-chuck in place.

FIG. 1D is a simplified longitudinal cross-sectional view 150 of a wafer-showerhead 154. In this case, wafer-showerhead 154 is bonded to an anodized aluminum base 155. There exists a plenum 152 between the anodized aluminum base 155 and wafer-showerhead 154 as indicated in FIG. 1D. The wafer-showerhead 154 is perforated allowing any fluid that is present in the plenum region to pass to the exterior of the wafer-showerhead.

Based on the foregoing, there is a need for cleaning silicon carbide materials to achieve high purity materials.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

The cleaning of silicon carbide materials on a large scale is described. In the following description, for purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Cleaning Processes

Figure 1A:
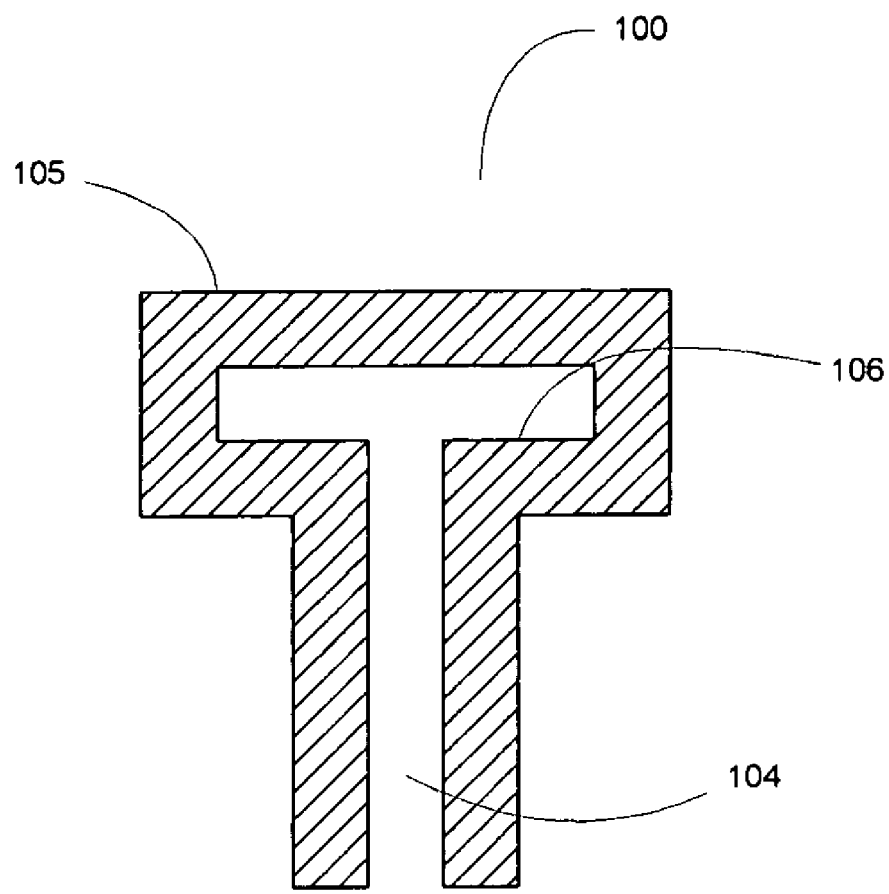
FIG. 1A is a simplified longitudinal cross-sectional view of a hollow silicon carbide wafer-lift pin 100.
Figure 1B:
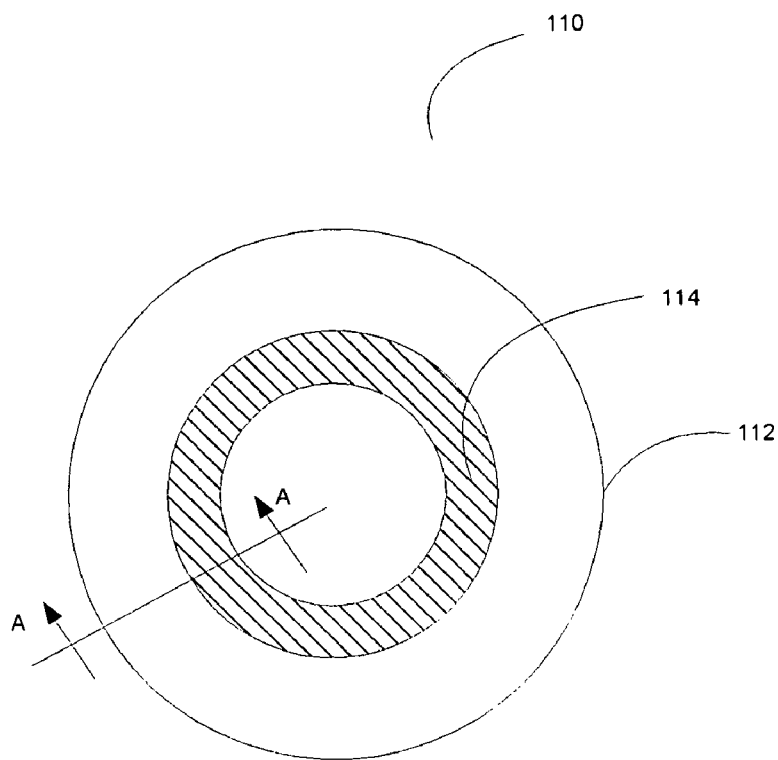
FIG. 1B is a simplified drawing illustrating a plan view 110 of a silicon carbide wafer-ring.
Figure 1C:
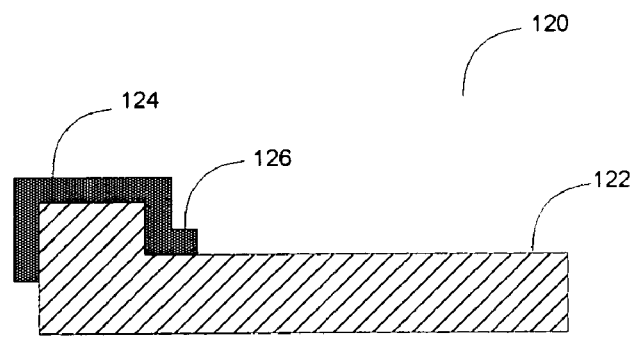
FIG. 1C is a simplified drawing illustrating a cross-sectional view 120 of the wafer-ring of FIG. 1B.
Figure 1D:
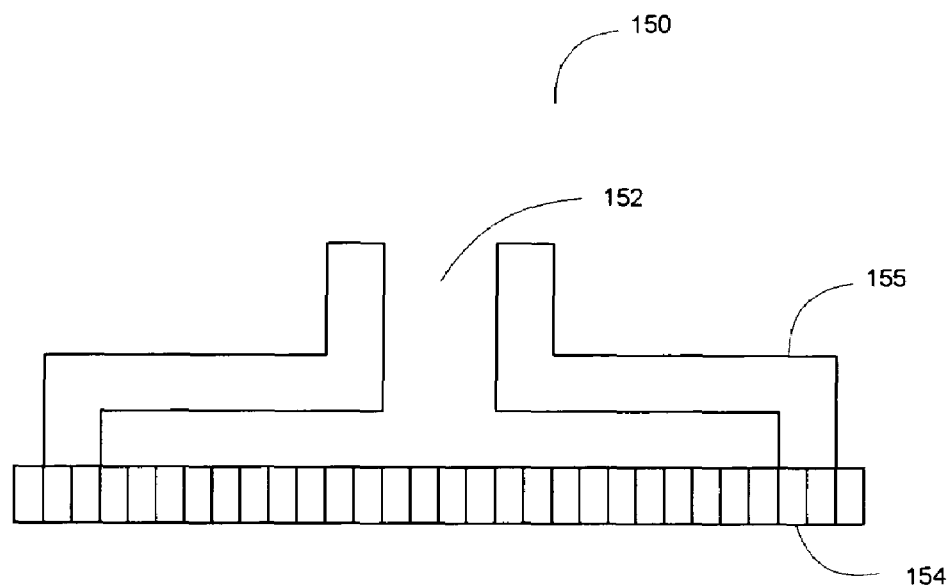
FIG. 1D is a simplified longitudinal cross-sectional view 150 of a wafer-showerhead.
Figure 2:
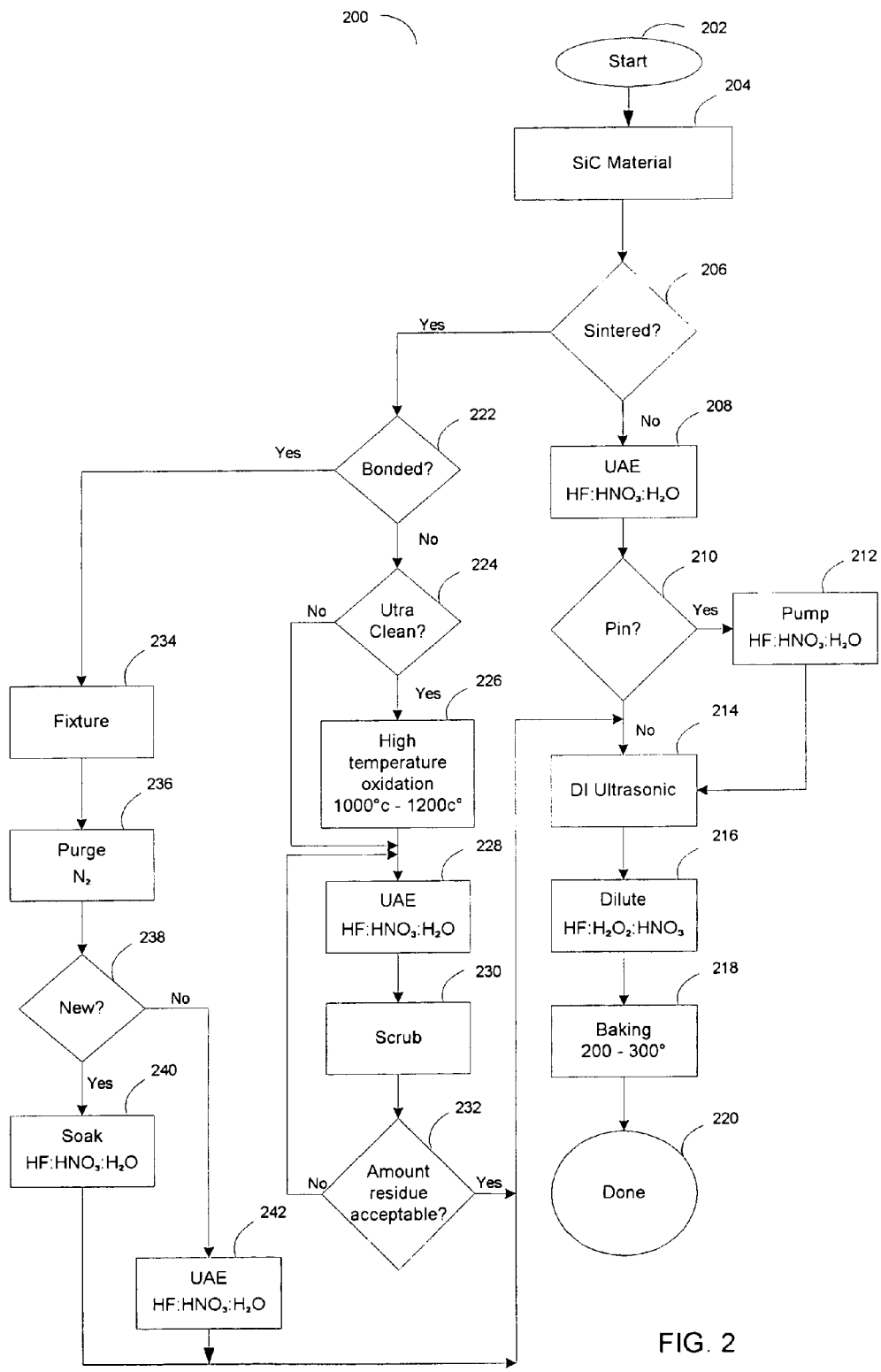
FIG. 2 is a flowchart illustrating some steps in a method for cleaning silicon carbide materials.

FIG. 2 is a flowchart that illustrates some steps in a method 200 for cleaning of silicon carbide materials, according to certain embodiments of the invention. Method 200 starts at operation 202 and proceeds to operation 204. Silicon carbide materials, such as silicon carbide wafer-lift pins, wafer-rings and wafer-showerheads are obtained at operation 204.

At operation 206, a decision is made as to whether the silicon carbide material is sintered. If the silicon carbide material is not sintered, then method 200 proceeds to operation 208 where the silicon carbide material undergoes ultrasonic assisted etching (UAE) in an aqueous acid solution. Various techniques may be used to perform UAE on the silicon carbide material. The techniques may vary from implementation to implementation. One such technique is described in U.S. patent application Ser. No. 10/627,416 entitled "ULTRASONIC ASSISTED ETCH USING CORROSIVE LIQUIDS" filed by Samantha S. H. Tan on Jul. 24, 2003, the content of which is incorporated herein by reference.

According to certain embodiments, at operation 208, the silicon carbide material undergoes UAE by ultrasonication in an aqueous acid solution that includes water ($H_2O$) and acids such as hydrofluoric acid (HF) and nitric acid ($HNO_3$). Such an aqueous solution may be made up of 5%-20% wt. HF, 20%-95% wt. $HNO_3$, and 0%-80% wt. $H_2O$. The UAE operation is performed for about 10 to 15 minutes at about room temperature to about 50° C. The ultrasonication is performed at a frequency of about 25 kHz to about 40 kHz and at a power of about 30 watts/gal to about 50 watts/gal.

Next, at operation 210 a decision is made as to whether the silicon carbide material is a wafer-lift pin. If the silicon carbide material is a wafer-lift pin, then the wafer-lift pin is cleaned for about 30 minutes to about an hour in an aqueous acid solution using a pump at operation 212. A multiplicity of wafer-lift pins may be cleaned simultaneously by using a pin rack. The pin rack is described in further detail herein with reference to FIGS. 4A and 4B. Operation 212 is described in greater detail herein with reference to FIG. 5. Throughout method 200, a multiplicity of silicon carbide wafer-rings can be cleaned simultaneously by placing multiple silicon carbide wafer-rings in a wafer boat. Such a wafer boat is described in further detail herein with reference to FIG. 3.

If the silicon carbide material is not a wafer-lift pin, then at operation 214, the silicon carbide material is ultrasonicated in a bath of deionized water. Various techniques may be used to perform the ultrasonication in deionized water of the silicon carbide material. The techniques may vary from implementation to implementation. One such technique is described in U.S. patent application Ser. No. 10/627,185 entitled "CLEANING PROCESS AND APPARATUS FOR SILICATE MATERIALS" filed by Samantha S. H. Tan and Ning Chen on Jul. 24, 2003, the content of which is incorporated herein by reference. According to certain embodiments, at operation 214, the silicon carbide material undergoes ultrasonication in a bath of deionized water for about 30 minutes to about 60 minutes. The temperature may range from about room temperature to about 50° C. The ultrasonication is performed at a frequency of about 25 kHz to about 40 kHz and at a power of about 30 watts/gal to about 50 watts/gal at about 80-90% power intensity.

The method 200 then proceeds to operation 216 where the silicon carbide material makes contact with a dilute solution that includes hydrofluoric acid, hydrogen peroxide ($H_2O_2$) and nitric acid. Such a dilute solution may be made up of 0.5%-1.5% wt. HF, 1%-10% wt. $H_2O_2$, and 0.1%-0.5% wt. $HNO_3$, according to certain embodiments. According to other embodiments, such a dilute solution may be made up of 0.1%-5.0% wt. HF, 0.1%-20.0% wt. $H_2O_2$, and 0.1%-5.0% wt. $HNO_3$ The silicon carbide material makes contact with the dilute solution of HF:$H_2O_2$:$HNO_3$ for about 5 minutes to about 15 minutes at about room temperature.

Next, the method 200 proceeds to operation 218 where the silicon carbide material is baked at a temperature of about 200° C. to about 300° C. Silicon carbide wafer-rings and wafer-lift pins are baked for about 2 hours to about 3 hours. Silicon carbide wafer-showerheads with fixtures are baked for about 6 hours to about 24 hours. The baking in operation 218 may be performed in either a convection over, a nitrogen-purge oven, or a vacuum oven located in a class 1000 clean room. Further, according to certain embodiments, heat lamps may be used if moisture content is not a critical consideration. Method 200 then terminates at operation 220.

Referring back to operation 206, if the silicon carbide material is determined to be sintered, then method 200 proceeds to operation 222. At operation 222, a decision is made as to whether the sintered silicon carbide material is bonded to another material.

If the sintered silicon carbide material is not bonded, then a decision is made at operation 224 as to whether the sintered silicon carbide material needs to meet a high purity requirement.

If the sintered silicon carbide material is to meet a high purity requirement, then the silicon carbide material is oxidized at a high temperature in operation 226. According to certain embodiments, the sintered silicon carbide material is oxidized at a temperature of about 1000° C. to about 1200° C. According to certain other embodiments, the sintered silicon carbide material is oxidized at a temperature of about 800° C. to about 1500° C. The oxidation converts the impurities in the silicon carbide material to oxides. Such oxides may then be removed by UAE at operation 228. The UAE operation is similar to the one described herein with reference to operation 208.

Method 200 then proceeds to operation 230 where the sintered silicon carbide material is scrubbed to remove impurities. For example, the sintered silicon carbide material may be scrubbed using a nylon brush.

At operation 232, a decision is made as to whether the sintered silicon carbide material has an unacceptable amount of residue. According to certain embodiments, the sintered silicon carbide material may be wiped using an acetone isopropyl alcohol wipe. The acetone isopropyl alcohol wipe is then visually inspected for residue. If an unacceptable amount of residue is present, then operations 228 and 230 are repeated until the amount of residue is acceptable. According to certain other embodiments, the amount of residue may be determined using an appropriate analyzer. If at operation 232, it is decided that the amount of residue is acceptable, then method 200 proceeds to operation 214, which is previously described herein.

Referring back to operation 222, if it is decided that the sintered silicon carbide material is bonded to another material, then the bonded/sintered silicon carbide material is fixtured at operation 234. For example, a silicon carbide wafer-showerhead may be bonded to an anodized aluminum base. In such a case, a chemically resistant fixture may be attached to the anodized aluminum base by means of screws in order to prevent the anodized aluminum base from chemically reacting with any of the chemicals used during the cleaning processes as outlined by method 200. The fixture and screws are made of a chemically resistant material such as polyethylene, according to certain embodiments of the invention. The type of chemically resistant material may vary from implementation to implementation.

Next, at operation 236, the fixtured silicon carbide material is purged with nitrogen gas at about 10 psi to about 20 psi pressure. The nitrogen gas purge continues until the final cleaning operation of the bonded and sintered silicon carbide material is complete. The nitrogen gas purge prevents migration of chemicals, due to capillary action, from the various chemical baths in method 200 to the anodized aluminum base of the wafer-showerhead, for example. The cleaning process of a fixtured wafer-showerhead is explained in further detail with reference to FIG. 6 herein.

Next, at operation 238, a decision is made as to whether the fixtured silicon carbide material is new. If the fixtured silicon carbide material is not new, i.e., it is recycled, for example, then the fixtured silicon carbide material undergoes a UAE operation at operation 242. The UAE operation is similar to the one described herein with reference to operation 208.

From operation 242, the method 200 proceeds to operation 214, which is previously described herein.

If it is decided that the fixtured silicon carbide material is new, then the method 200 proceeds to operation 240 where the fixtured silicon carbide material is soaked in an aqueous solution of $HF:HNO_3:H_2O$. Such an aqueous solution may be made up of 5%-20% wt. HF, 20%-95% wt. $HNO_3$, and 0%-80% wt. $H_2O$. The fixtured silicon carbide material is soaked in the $HF:HNO_3:H_2O$ aqueous solution at about room temperature. After soaking the fixtured silicon carbide material, method 200 proceeds to operation 214, which is previously described herein.

Wafer Boat

Figure 3:
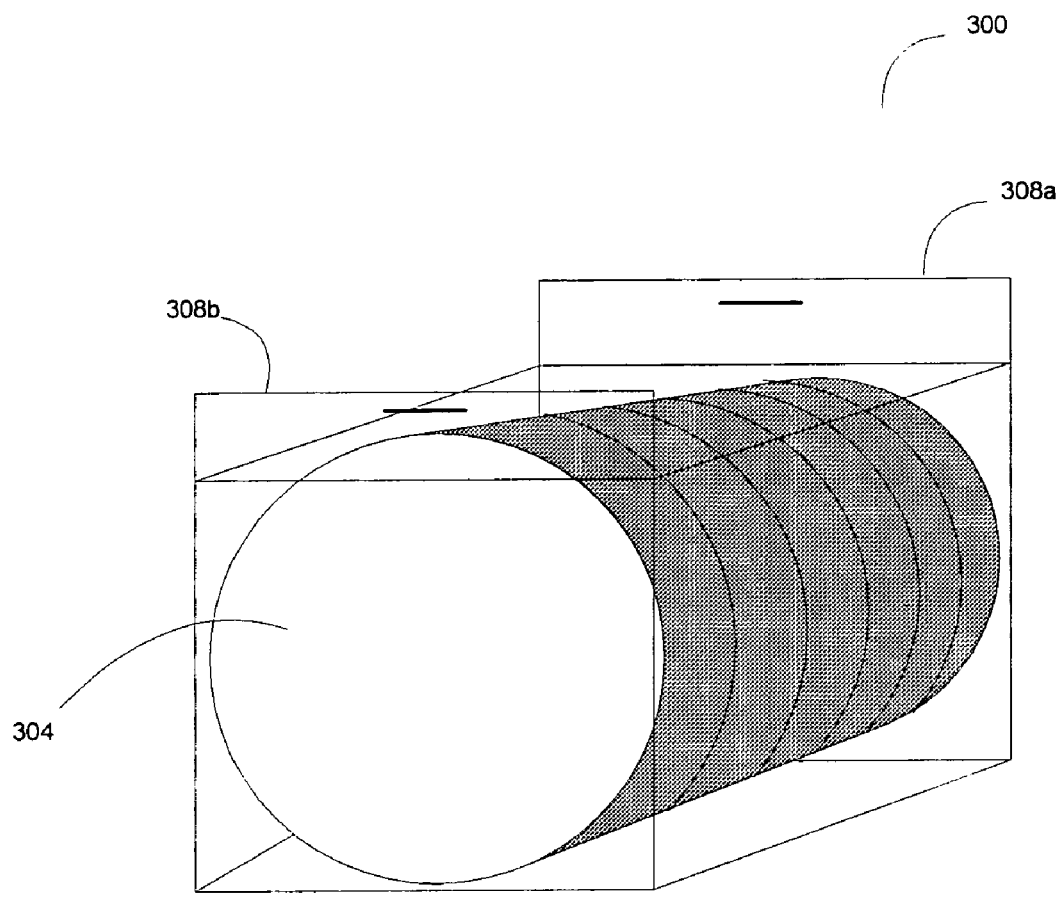
FIG. 3 is a simplified drawing illustrating a wafer boat 300 adapted for cleaning a multiplicity of silicon carbide wafer-rings.

FIG. 3 is a simplified drawing illustrating a wafer boat 300 adapted for cleaning a multiplicity of silicon carbide wafer-rings. Wafer boat 300 includes several slots, with each slot adapted to hold a wafer-ring. Thus, wafer boat 300 can hold several wafer-rings 304 such that several wafer-rings can be cleaned simultaneously. Wafer boat 300 includes handles 308a and 308b for convenient handling.

Pin Rack

Figure 4B:
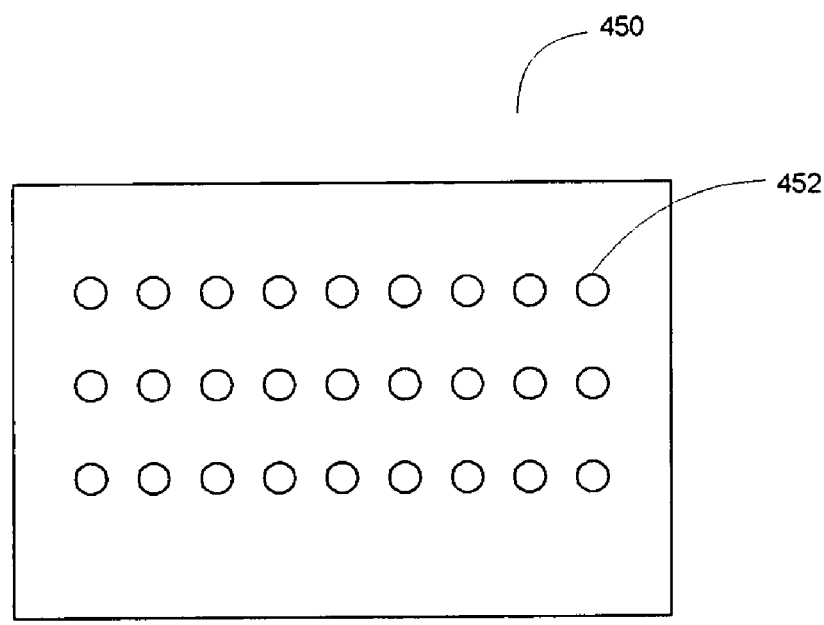
FIG. 4B is a plan view of top portion of the pin rack of FIG. 4A.
Figure 4A:
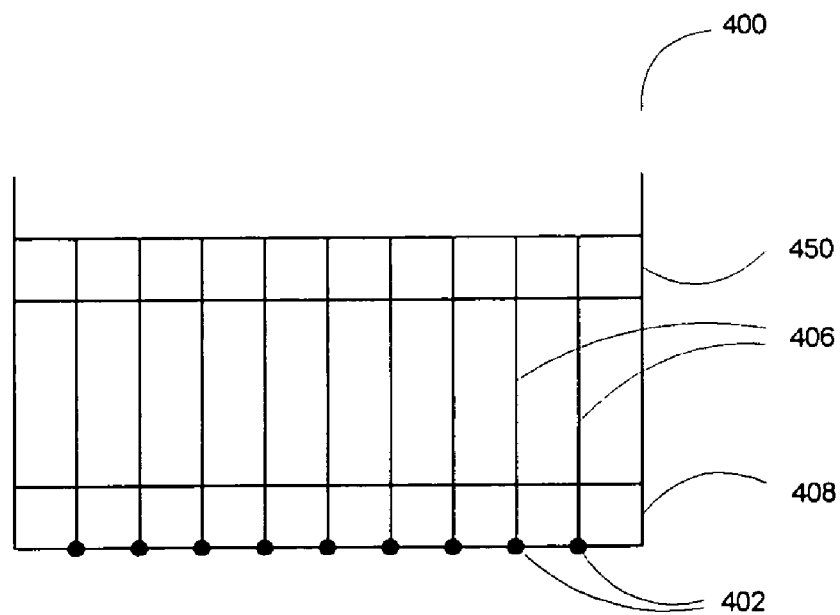
FIG. 4A is a simplified schematic illustrating a pin rack 400 for holding a multiplicity of silicon carbide wafer-lift pins, according to certain embodiments of the invention.

FIG. 4A is a simplified schematic illustrating a pin rack 400 for holding a multiplicity of silicon carbide wafer-lift pins, according to certain embodiments of the invention. Pin rack 400 includes a top portion 450 and a bottom portion 408. Wafer-lift pins 406 are inserted through the top portion 450 and extend to the bottom portion 408 with the pin heads 402 at the bottom. Top portion 450 is further described with reference to FIG. 4B.

FIG. 4B is a plan view of top portion 450 of pin rack of FIG. 4A. Top portion 450 is a perforated plate with perforations 452. A wafer-lift pin may be inserted in each perforation to extend to the bottom portion of the pin rack.

Set-up for Cleaning Wafer-Lift Pins

Figure 5:
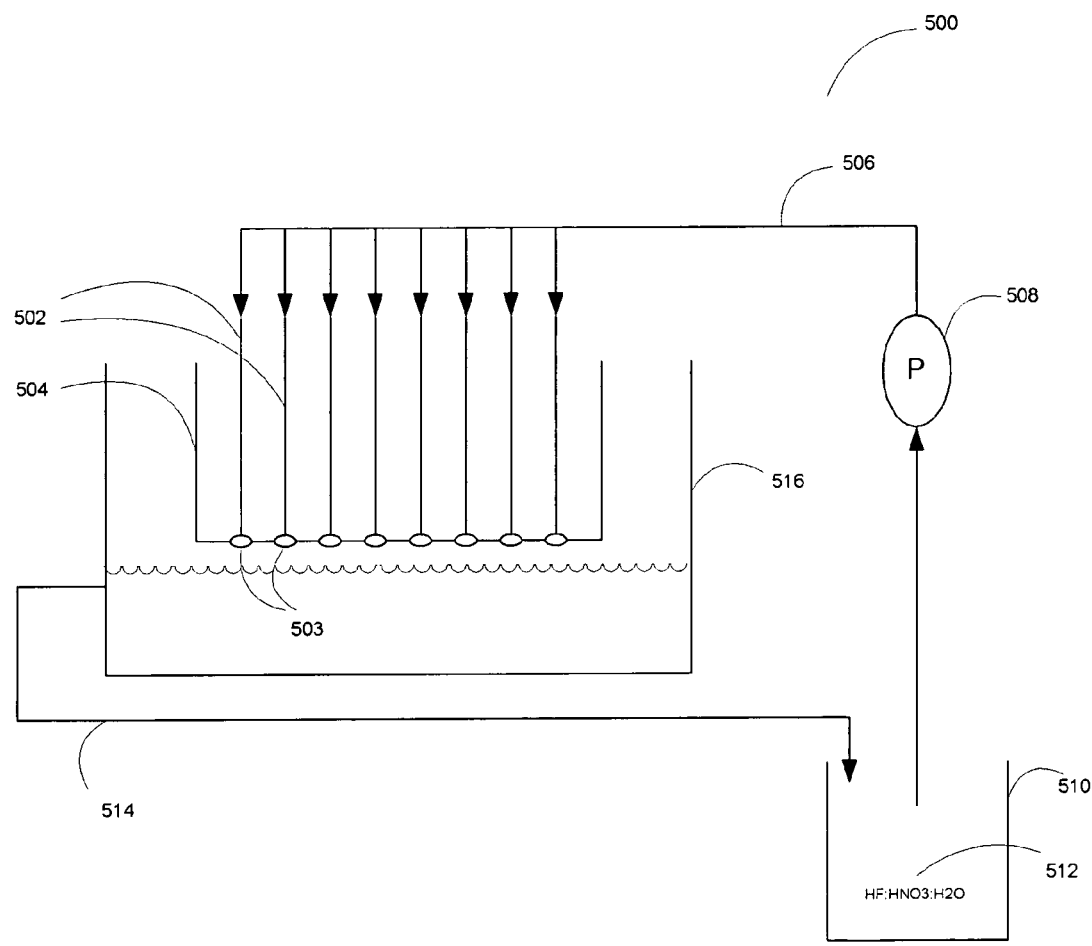
FIG. 5 is a simplified schematic illustrating a set-up for cleaning silicon carbide wafer-lift pins, according to certain embodiments of the invention.

FIG. 5 is a simplified schematic illustrating a set-up for cleaning silicon carbide wafer-lift pins, according to certain embodiments of the invention. In FIG. 5, the set-up 500 includes the following, according to certain embodiments:

1) a reservoir 510 that contains an aqueous solution 512 of HF, $HNO_3$, and $H_2O$;
2) a pump 508, which can be a peristaltic pump;
3) a manifold 506 attached to pump 508, which manifold delivers aqueous solution 512 to the wafer-lift pins;
4) a pin rack 504 for holding wafer-lift pins 502;
5) a tank 516 for catching any overflow of aqueous solution 512; and
6) a return hose 514 connecting tank 516 to reservoir 510.

In FIG. 5, wafer-lift pins 502 are oriented on pin rack 504 such that pin heads 503 are at the bottom of the pin rack. Pump 508 pumps aqueous solution 512 from reservoir 510 through the manifold such that aqueous solution 512 fills the plenum of each wafer-lift pin to overflowing capacity. The overflow of aqueous solution 512 is collected at tank 516 and returned by return hose 514 to reservoir 510. To prevent contamination, reservoir 510, pump 508, manifold 506, pin rack 504, tank 516, and return hose 514 are all made of chemically resistant materials. One example of a chemically resistant material is polyethylene.

Fixtured Wafer-Showerheads

Figure 6:
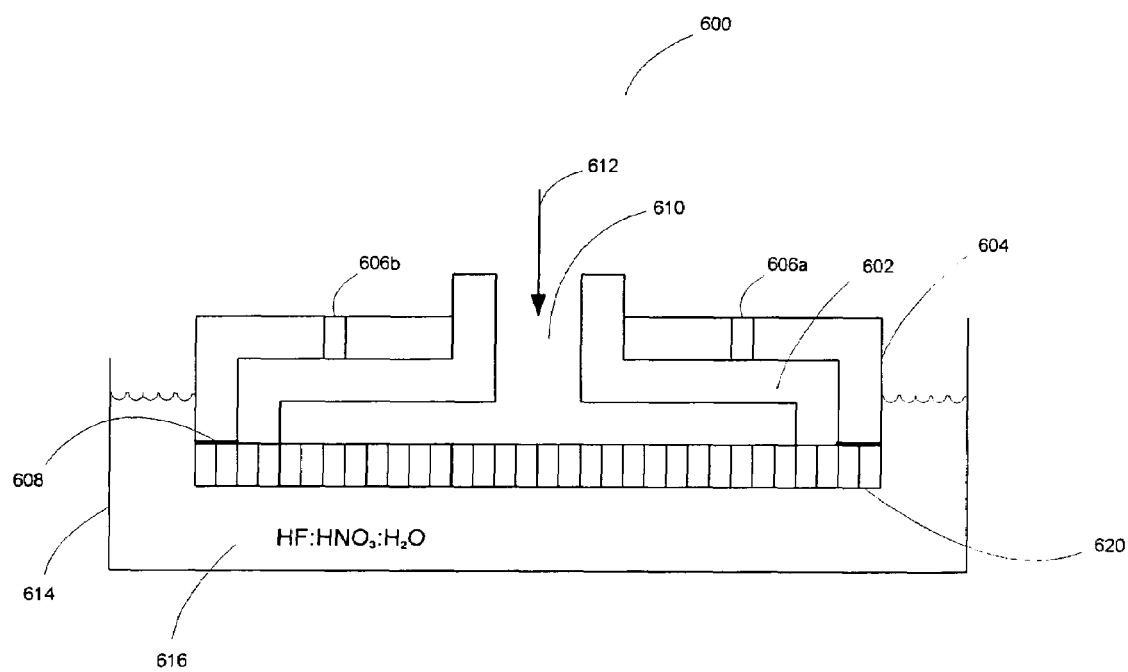
FIG. 6 is a simplified schematic illustrating a set-up adapted for cleaning a fixtured silicon carbide wafer-showerhead, according to certain embodiments of the invention.

FIG. 6 is a simplified schematic illustrating a set-up adapted for cleaning a fixtured silicon carbide wafer-showerhead, according to certain embodiments of the invention. Set-up 600 of FIG. 6 includes the following, according to certain embodiments:

a) a tank 614;
b) an aqueous solution 616 in tank 614;
c) a wafer-showerhead 620;
d) an anodized aluminum base 602 that is bonded to wafer-showerhead 620;
e) fixture 604 that is secured to anodized aluminum base 602 via screws 606a and 606b;
f) an O-ring 608; and
g) a flow of nitrogen gas 612 for purging the wafer-showerhead 620 and anodized aluminum base 602 through plenum 610.

To prevent contamination, fixture 604 is needed to cover the anodized aluminum base 602 to prevent a chemical reaction between the anodized aluminum base 602 and aqueous solution 616. O-ring 608 provides a seal between fixture 604 and the anodized aluminum base 602. Fixture 604 and screws 606a and 606b are made of a chemically resistant material. The type of chemically resistant material may vary from implementation to implementation. According to certain embodiments, polyethylene may be used. Nitrogen gas stream 612 is used as a purge in order to prevent migration of aqueous solution 616 up to anodized aluminum base 602 through capillary action.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any express definitions set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for cleaning silicon carbide materials on a large scale, the method comprising the acts of:
   using an integrated system that is adapted for handling a multiplicity of said silicon carbide materials during said cleaning;
   purging at least one opening within each of silicon carbide materials using a continuous flow of nitrogen gas stream;
   ultrasonicating said silicon carbide materials in an aqueous solution of inorganic acid after the purging has begun;
   ultrasonicating said silicon carbide materials in a bath of deionized water after the purging has begun; and
   wherein purging using the continuous nitrogen gas stream continues during ultrasonicating of said silicon carbide materials in the aqueous solution and in the bath of deionized water;
   wherein purging the at least one opening within each of the silicon carbide materials:
      blocks the migration of the aqueous solution of inorganic acid to a base material; and
      occurs before placing the silicon carbide material in the solution.

2. The method of claim 1, wherein said silicon carbide materials are sintered.

3. The method of claim 1, wherein said silicon carbide materials are formed using chemical vapor deposition (CVD).

4. The method of claim 1, further comprising the act of oxidizing said silicon carbide materials.

5. The method of claim 4, wherein
the act of oxidizing comprises using a temperature from about 800 degrees Celsius to about 1500 degrees Celsius.

6. The method of claim 1, further comprising the act of scrubbing said silicon carbide materials.

7. The method of claim 6, further comprising the act of contacting said silicon carbide materials in a dilute aqueous solution of inorganic acid after ultrasonicating said silicon carbide materials in said bath of deionized water.

8. The method of claim 7, wherein said dilute aqueous solution of inorganic acid is selected from said group consisting of $HF:HNO_3:H_2O$ and $HF:H_2O_2:HNO_3$.

9. The method of claim 8, wherein said dilute aqueous solution of inorganic acid comprises
0.5%-1.5% wt. HF;
1%-10% wt. $H_2O_2$; and
0.1%-0.5% wt. HNO3.

10. The method of claim 7, wherein a temperature of said dilute aqueous solution of inorganic acid is maintained from about 20° C. to about 50° C.

11. The method of claim 1, wherein said aqueous solution of inorganic acid is selected from said group consisting of $HF:HNO_3:H_2O$ and $HF:H_2O_2:HNO_3$.

12. The method of claim 1, wherein said aqueous solution of inorganic acid comprises:
5%-20% wt. HF;
20%-95% wt. HNO3; and
0%-80% wt. $H_2O$.

13. The method of claim 1, wherein a temperature of said aqueous solution of inorganic acid is maintained from about 20 degrees Celsius to about 50 degrees Celsius.

14. The method of claim 1, wherein the act of ultrasonicating said silicon carbide materials in said aqueous solution of inorganic acid is performed for a duration of time from about 10 minutes to about 15 minutes.

15. The method of claim 1, wherein the act of ultrasonicating said silicon carbide materials in said aqueous solution of inorganic acid is performed at a power from about 30 watts per gallon to about 50 watts per gallon.

16. The method of claim 1, wherein the act of ultrasonicating said silicon carbide materials in said aqueous solution of inorganic acid is performed at an ultrasonic frequency from about 25 Kilo-hertz to about 40 Kilo-hertz.

17. The method of claim 1, wherein
the temperature of said bath of deionized water is maintained from about 20 degrees Celsius to about 50 degrees Celsius.

18. The method of claim 1, wherein the act of ultrasonicating said silicon carbide materials in said bath of deionized water is performed for a duration of time from about 30 minutes to about 61 minutes.

19. The method of claim 1, wherein the act of ultrasonicating said silicon carbide materials in said bath of deionized water is performed at a power intensity from about 80% to about 90% of 40 watts/gallon.

20. The method of claim 1, wherein the act of ultrasonicating said silicon carbide materials in said bath of deionized water is performed at an ultrasonic frequency from about 27 Kilo-hertz to about 40 Kilo-hertz.

21. The method of claim 1, wherein the act of ultrasonicating said silicon carbide materials in said bath of deionized water is performed at a power from about 30 watts per gallon to about 50 watts per gallon.

22. The method of claim 1, further comprising the act of baking said silicon carbide materials.

23. The method of claim 22, wherein the act of baking comprises using a temperature of about 200 degrees Celsius to about 300 degrees Celsius.

24. The method of claim 22, wherein the act of baking is performed for a duration of time from about 2 hours to about 3 hours for silicon carbide wafer-rings and silicon carbide wafer-lift pins.

25. The method of claim 22, wherein the act of baking is performed using a nitrogen purge oven.

26. The method of claim 22, wherein the act of baking is performed using a convection oven.

27. The method of claim 22, wherein the act of baking is performed using a vacuum oven.

28. The method of claim 1, wherein the act of purging said silicon carbide materials using said nitrogen gas stream is performed at a pressure from about 10 psi to about 20 psi.

29. The method of claim 1, further comprising the act of soaking said silicon carbide materials in said aqueous solution of inorganic acid.

30. The method of claim 29, wherein said aqueous solution of inorganic acid is selected from said group consisting of $HF:HNO_3:H_2O$ and $HF:H_2O_2:HNO_3$.

31. The method of claim 29, wherein said aqueous solution of inorganic acid comprises:
5%-20% M. HF;
20%-95% M. HNO3; and
0%-80% M. $H_2O$.

32. The method of claim 29, wherein a temperature of said aqueous solution of inorganic acid is maintained from about 20 degrees Celsius to about 50 degrees Celsius.

33. The method of claim 1, wherein said integrated system includes chemically resistant materials that are flexible.

34. The method of claim 33, wherein said chemically resistant materials includes high-density polyethylene.

35. The method of claim 1, wherein said integrated system includes robotic mechanisms.

36. The method of claim 1, wherein said integrated system is adapted for handling silicon carbide wafer-lift pins.

37. The method of claim 36, wherein said integrated system includes one or more a pin-racks adapted for holding said silicon carbide wafer-lift pins.

38. The method of claim 1, wherein said integrated system is adapted for handling silicon carbide wafer-showerheads.

39. The method of claim 1, wherein said integrated system is adapted for handling silicon carbide wafer-rings.

40. The method of claim 39, wherein said integrated system includes one or more wafer boats adapted for holding said silicon carbide wafer-rings.

41. The method of claim 1, further comprising using a peristaltic pump and a manifold for cleaning interior surfaces of hollow silicon carbide wafer-lift pins.

* * * * *